Aug. 15, 1933.  C. E. STARR  1,922,871
BRAKE TESTING MECHANISM
Filed Aug. 10, 1927   2 Sheets-Sheet 1

INVENTOR
CHARLES E. STARR
BY Charles S. Evans
HIS ATTORNEY.

Aug. 15, 1933.  C. E. STARR  1,922,871
BRAKE TESTING MECHANISM
Filed Aug. 10, 1927  2 Sheets-Sheet 2
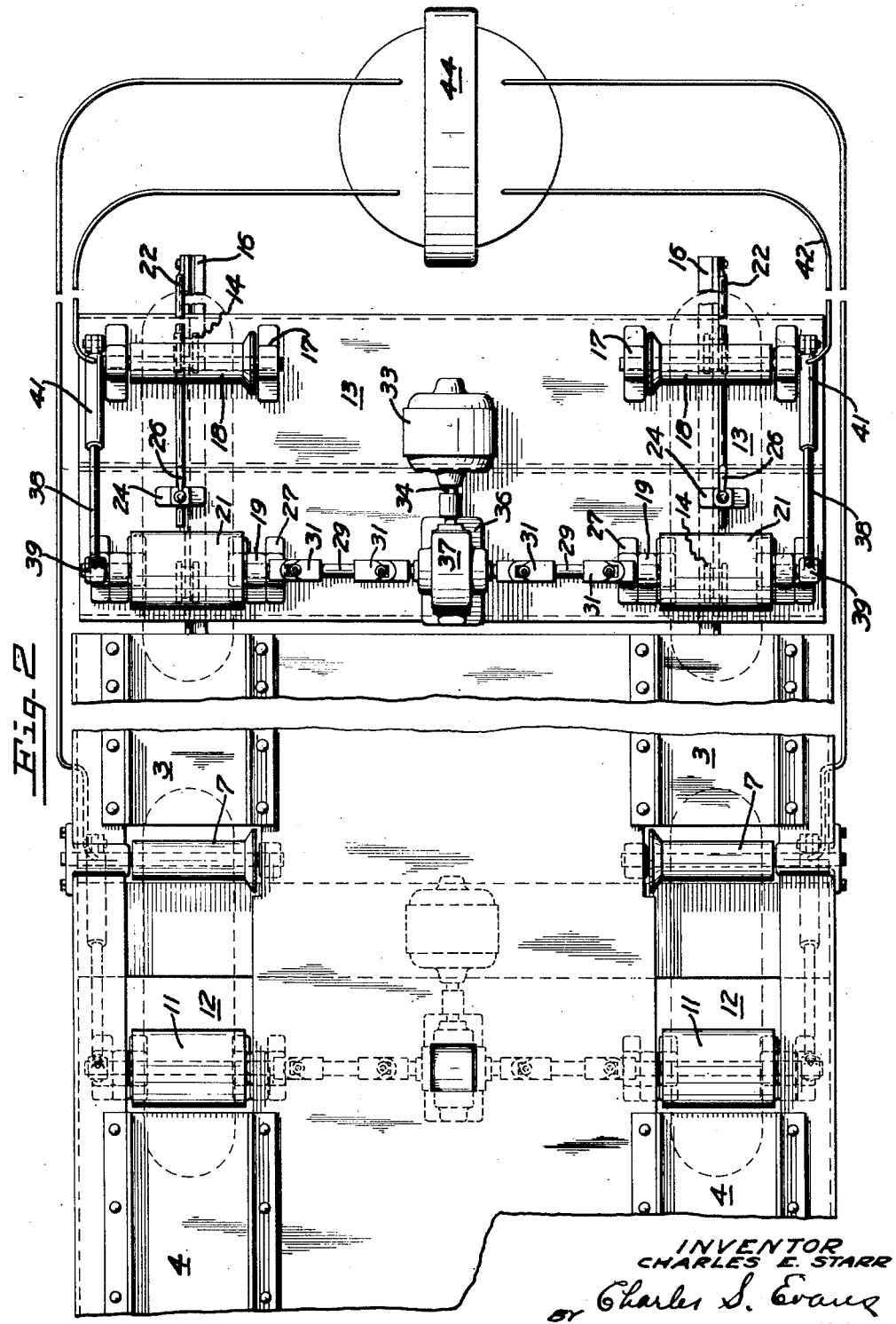
INVENTOR
CHARLES E. STARR
BY Charles S. Evans
HIS ATTORNEY.

Patented Aug. 15, 1933

1,922,871

UNITED STATES PATENT OFFICE 1,922,871

BRAKE TESTING MECHANISM

Charles E. Starr, Whittier, Calif., assignor to Bendix Aviation Corporation, South Bend, Ind., a Corporation of Delaware Application August 10, 1927. Serial No. 211,966

21 Claims. (Cl. 265—25)

My invention relates to a brake testing mechanism especially adapted for testing the brakes of automobiles and the broad object of my invention is the provision of an apparatus which will readily and truly indicate the condition of the brakes.

Another object of my invention is the provision of an apparatus of the character described which will indicate the degree of brake adjustment required in order to compensate for the distribution of the weight of the vehicle.

Another object of my invention is the provision of an apparatus of the character described which will lift the vehicle upon which the brakes are to be tested, at the moment that the condition of the brakes is determined.

Another object of the invention is the provision of an apparatus of the character described which can be adjusted to accommodate automobiles of various wheelbases.

Another object of the invention is the provision of an apparatus of the character described that can be rigidly fixed in position after a vehicle is supported thereon.

Other objects of the invention, together with the foregoing, will be set forth in the following description of the preferred embodiment of means for practicing the invention, and which is illustrated in the drawings accompanying and forming part of the specification. It is to be understood that I do not limit myself to the showing made by the said description and drawings as I may adopt variations of my preferred form within the scope of the invention as set forth in the claims.

Referring to the drawings:

Fig. 2 is a plan view of the brake testing mechanism shown in Fig. 1.

Figure 1:
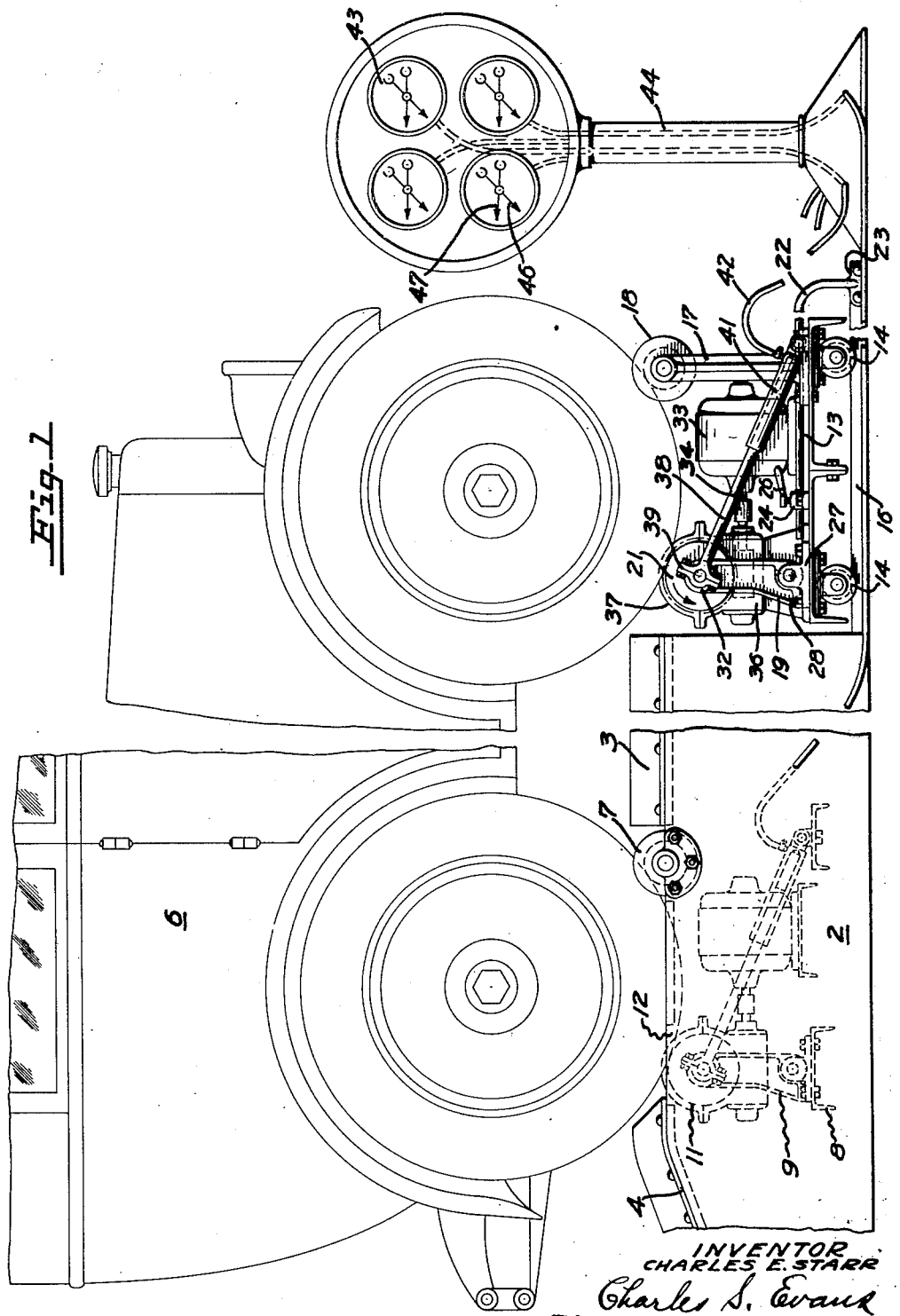
Fig. 1 is a vertical view showing the brake testing mechanism, and an automobile supported thereon. A portion of the figure is omitted in order to shorten the view.

With the advent of the automobile, the matter of brake adjustment has been always a problem, and this is especially so to-day with the common prevalence of four wheel brakes. In order for brakes to operate efficiently and safely, it is necessary that they be properly equalized. In two wheel brakes, that is brakes on the rear wheels only, it is necessary that both brakes be applied simultaneously. In four wheel brakes, it is necessary that the brakes for both the rear wheels and both the front wheels be applied simultaneously, but with a lesser braking force on the front wheels than that applied to the rear wheels; so that the front wheels will not grab as soon as the rear wheels do.

Heretofore the adjustment of brakes has been more or less of a hit and miss proposition, the mechanic merely adjusting them by experiment, and in this method the distribution of weight of the automobile is not considered.

Recently efforts have been made to determine more positively the amount of brake adjustment required. These methods generally comprise seating the automobile wheels on rollers, applying the brakes and determining the force necessary to turn the rollers. Upon observing the various forces required for the different wheels, the brakes are adjusted accordingly. This method neglects an important factor and that is the weight of the automobile, which is far from equally carried by each wheel. Hence if one wheel happens to support more than its proportionate share of the weight and therefore requires a greater braking force, this cannot be determined by the above method.

In terms of broad inclusion, my invention comprises an apparatus which is designed to test the condition of the brakes and to indicate the degree of adjustment necessary to properly adjust and equalize them; and which will also include as a factor the distribution of weight of an automobile upon its wheels.

In greater detail, my invention comprises a platform 2 having a pair of guideways 3 and an incline 4 for each guideway; so that a vehicle such as an automobile 6 may be driven thereon. In the rear portion of the platform, and projecting above and journaled in each of the guideways 3 is a roller 7 adapted to turn freely. The roller acts as a stop to resist the forward movement of the vehicle on the platform. Pivotally or movably mounted on a base or platform 8 and rearwardly disposed from the rollers 7 are a pair of supports 9 in alinement with the guideways 3. Rollers 11 are journaled on the supports and are adapted to project thru an opening 12 in the guideways. The tops of the rollers are approximately level with the surface of the guideways.

Means are provided for accommodating automobiles of various wheelbases. In front of the platform 2 is a movable carriage 13 which extends the width of the platform and is mounted on wheels 14 adapted to ride on the parallel rails 16. On the forward part of the platform and near the end thereof are a pair of fixed supports 17 in alinement with the guideways 3, and journaled on each of said supports is a roller 18 which is adapted to freely rotate and to project a trifle above the level of the guideways. On the carriage are also pivoted a pair of supports 19 near the end thereof opposite to that upon which the fixed supports 17 are mounted. The movable supports are also in alinement with the guideways 3. Journaled on each of the supports 19 is a roller 21 which is approximately on a level with that of the guideways 3. It is thus apparent that when an automobile is driven upon the platform, the front wheels will ride thereon and upon striking the rollers 21 and 18 will rest between them, and the carriage will travel forward until resistance to the forward motion of the vehicle is caused by the rollers 7 engaging the wheels. The automobile is then stopped.

In order to prevent movement after the automobile is in the desired position, a pair of rods 22 are anchored to the rails 16, or to any other suitable means, as shown at 23 in Fig. 1. The rods are bent and are adapted to slide within the guideways 24 fixed to the carriage, while a clamping screw 26 is adapted to engage the rods, and hence clamp them to the carriage.

The specific method of mounting all the movable supports and that of the driving mechanism therefor is the same, and hence for the sake of simplicity, only the mounting and driving means on the movable carriage are described; it being understood that the rear supports 9 and the motor therefor differ only in that they are mounted on fixed bases.

Each of the supports 19 is pivoted, at its bottom on one side thereof, in the bearings 27 rigidly fixed to the carriage. The opposite side of the bottom forms a stop 28 which optionally permits the support to rest in a vertical position or to rotate in only one direction from the vertical. A flexible shaft 29 having the universal joints 31, as indicated in Fig. 2, is journaled in bearings 32 on the supports 19. The rollers 21 are keyed to the shaft and are hence adapted to rotate upon rotation thereof.

Means are provided for driving the shaft 29. A motor 33 having the driving shaft 34 is mounted on the carriage. The driving shaft 34 is adapted to drive the shaft 29 by means of any conventional system of reduction gears interposed between the two shafts. The gears are enclosed within the housings 36 and 37. It is preferred to use a motor which rotates at about 1500 R. P. M. and to provide a reduction; so that the wheels of the automobile can rotate at about 8 to 10 R. P. M. The direction of rotation of the rollers, as indicated by the arrow in Fig. 1, is in a direction opposite to that in which the supports 19 rotate from the vertical. Inasmuch as the shaft 29 is flexible on account of the universal joints interposed therein, it is apparent that the shaft can be driven while the supports 19 rotate.

Means are provided for yieldingly resisting the force of rotation of the supports 19 from the vertical position. Connected to the supports are a pair of pistons 38 which are preferably journaled near the ends of the shaft 29 by means of bearings 39. The pistons are adapted to slide within an oil filled cylinder 41 which is pivotally mounted on the bottom of the carriage, at the side opposite to that upon which the pivoted supports are mounted. Each piston is connected by means of an oil line 42 to a pressure gauge 43, which indicates the pressure developed when the piston compresses the oil in the cylinder.

In the preferred embodiment, four pressure gauges are mounted in a standard 44. Two of the gauges are connected to the pair of cylinders associated with the rear wheels of the automobile, and the other two are connected to the cylinders for the front wheels. It is preferred to provide a pair of dials 46 and 47 for each gauge. The dial 47 is a free dial which is adapted to move with the dial 46, and upon the release of the pressure developed within the cylinder, remain stationary to indicate the maximum pressure.

*Operation.*—When a vehicle such as an automobile is mounted on the rollers, as illustrated in Fig. 1, the motors are started to cause the rollers 21 to rotate in a direction shown by the arrow in Fig. 1. As long as the foot brake is not applied, the automobile wheels will rotate with the rollers 21. Upon application of the foot brake, resistance to the rotation of the automobile wheels is offered, and the resultant force of this resistance will cause the pivoted arms to rotate in a direction opposite to that of the direction of rotation of rollers 21. The auto will hence be lifted. The piston will then simultaneously compress the oil in the cylinder 41, and the resulting pressure can be determined by reading the gauges 43. It is thus seen that if a brake band grabs its corresponding brake drum with greater force than another brake mechanism on the same vehicle, the wheel associated with the former mechanism will offer more resistance than that associated with the latter. There will therefore be a greater compression force in the cylinder connected to the wheel offering the greater resistance, and the relative braking force of these two wheels can thus be readily determined by reading the gauges 43. At the same time, since the car is lifted, the weight distributed on the various wheels is a factor that is indicated by the apparatus.

From the above, it is seen that upon reading the dials, a mechanic can determine what brakes are out of adjustment and equalize them accordingly. Furthermore, by noticing the relative pressures developed, he can adjust four wheel brakes, so that the ratio of the braking force of the front and rear wheels is approximately 60 to 40 or any other desired ratio.

If the brakes of a vehicle having pneumatic tires on its wheels are to be tested, it is apparent that the apparatus will give a more accurate indication, if all the tires are inflated to approximately an equal pressure; so as to offer the same frictional resistance on each of the rollers. Therefore, it is desirable to equally inflate the tires before the test is made.

I claim:

1. In a brake testing mechanism, pivotally mounted supporting means, means for limiting movement thereof in one direction, means for yieldingly resisting movement thereof in the other direction, a roller journaled on said supporting means and bodily movable therewith and adapted for frictional engagement with a braked wheel, and means for driving said roller.

2. In a brake testing mechanism, movably mounted supporting means, means for limiting movement thereof in one direction, hydraulic means for yieldingly resisting movement thereof in another direction, a roller journaled on said supporting means movable bodily therewith and adapted for frictional engagement with a braked wheel, and means for driving said roller.

3. In a brake testing mechanism, movably mounted supporting means, means for limiting movement thereof in one direction, means for yieldingly resisting movement thereof in another direction, means for indicating the force effecting such movement, a roller journaled on said supporting means movable bodily therewith and adapted for frictional engagement with a braked wheel, and means for driving said roller.

4. In a brake testing mechanism, pivotally mounted supporting means, means for yieldingly resisting movement thereof, a roller journaled on said supporting means movable bodily therewith and adapted for frictional engagement with a braked wheel, and means for driving said roller.

5. In a brake testing mechanism, pivotally mounted supporting means, means for limiting movement thereof in one direction, means for yieldingly resisting movement thereof in the other direction comprising a piston connected to said supporting means and a pivotally mounted cylinder within which the piston slides, a roller journaled on said supporting means movable bodily therewith and adapted for frictional engagement with a braked wheel, and means for driving said roller.

6. In a brake testing mechanism, pivotally mounted supporting means, means for limiting movement thereof in one direction, means for yieldingly resisting movement thereof in the other direction comprising a piston connected to said supporting means and a pivotally mounted cylinder within which the piston slides, indicating means, means operable by sliding of the piston to actuate said indicating means, a roller journaled on said supporting means movable bodily therewith and adapted for frictional engagement with a braked wheel, and means for driving said roller.

7. In a brake testing mechanism, a movable carriage, fixed supporting means mounted on said carriage, supporting means pivotally mounted thereon, means for limiting movement of the pivoted supporting means in one direction, means for yieldingly resisting movement of the pivoted supporting means in the other direction, a roller journaled on each supporting means movable bodily therewith and adapted for frictional engagement with a braked wheel, and means for driving the roller on the pivoted supporting means.

8. In a brake testing mechanism, a movable carriage, fixed supporting means mounted thereon, supporting means pivotally mounted thereon, means for limiting movement of said pivoted supporting means in one direction, means for yieldingly resisting movement thereof in the other direction, a roller journaled on said pivoted supporting means movable bodily therewith and adapted for frictional engagement with a braked wheel, and means for driving said roller.

9. In a brake testing mechanism, a movable carriage, fixed supporting means mounted thereon, supporting means pivotally mounted thereon, means for limiting movement of said pivoted supporting means in one direction, hydraulic means for yieldingly resisting movement thereof in another direction, a roller journaled on the pivoted supporting means and adapted for frictional engagement with a braked wheel, and means for driving said roller.

10. In a brake testing mechanism, a movable carriage, fixed wheel supporting means mounted on said carriage, wheel supporting means pivotally mounted thereon, and means for preventing movement of the carriage at will.

11. In a brake testing mechanism, a movable carriage, fixed supporting means mounted on said carriage, supporting means pivotally mounted thereon, a rod, means for fixing said rod, and means for clamping the rod to said carriage.

12. In a brake testing mechanism, a movable carriage, fixed supporting means mounted on said carriage, supporting means pivotally mounted thereon, a rod, means for fixing said rod, and clamping means on the carriage for securing the rod thereto.

13. In an apparatus for testing the brakes of vehicles, means associated with each wheel of the vehicle for supporting the vehicle and lifting it upon application of the brakes, comprising movably mounted supporting means, means for limiting movement thereof in one direction, means for yieldingly resisting movement thereof in the other direction, a roller journaled on said supporting means movable bodily therewith and adapted for frictional engagement with a braked wheel, and means for driving said roller.

14. In an apparatus for testing the brakes of vehicles, means associated with each wheel of the vehicle for supporting the vehicle and lifting it upon application of the brakes, comprising movably mounted supporting means, means for limiting movement thereof in one direction, means for yieldingly resisting movement thereof in the other direction, means for indicating the force effecting such movement, a roller journaled on said supporting means movable bodily therewith and adapted for frictional engagement with a braked wheel, and means for driving said roller.

15. In a brake testing mechanism, pivotally mounted supporting means, means for limiting movement thereof in one direction, means for yieldingly resisting movement thereof in the other direction, a roller journaled on said supporting means movable bodily therewith and adapted for frictional engagement with a braked wheel, and means for driving said roller.

16. In a brake testing mechanism, pivotally mounted supporting means, means for limiting movement thereof in one direction, means for yieldingly resisting movement thereof in the other direction comprising a piston connected to said support and a cylinder within which the piston slides, a roller journaled on said supporting means movable bodily therewith and adapted for frictional engagement with a braked wheel, and means for driving said roller.

17. In a brake testing machine for vehicles, means for rotatably supporting and turning a wheel of the vehicle, including a revoluble roller, means supporting said roller for bodily movement transverse to its axis of rotation, means for rotating said roller in contact with the vehicle wheel to be tested, whereby to turn the wheel against its brake resistance and to produce reactive bodily movement of the roller, fluid pressure means resisting such bodily movement, and means responsive to such pressure for indicating the amount thereof.

18. In a brake testing machine, a member movable in two directions, means for limiting movement in one direction, means for yieldingly resisting movement in the other direction, a wheel engaging roller journaled on the member, and means for driving the roller.

19. In a brake testing machine, a pivoted member, means for limiting movement of the member in one direction, hydraulic means for yieldingly resisting movement of the member in the other direction, a wheel supporting roller journaled on the free end of the member, and means for driving the roller.

20. In a brake testing machine, a pivoted member, means for limiting movement of the member in one direction, means for yieldingly resisting movement of the member in the other direction including means for indicating the force effecting such movement, a wheel supporting and rotating roller journaled on the free end of the member, and means for driving the roller.

21. In a brake testing machine, a member movable in two directions, means for limiting movement in one direction, means for yieldingly resisting movement in the other direction including means for indicating the force effecting such movement, a wheel engaging roller journaled on the member, means for driving the roller, and a rotatable member arranged in spaced parellel relation to the roller.

CHARLES E. STARR.